United States Patent
Luo et al.

(10) Patent No.: US 7,781,083 B2
(45) Date of Patent: *Aug. 24, 2010

(54) HYDROGEN/HYDROGEN PEROXIDE FUEL CELL

(75) Inventors: Nie Luo, Urbana, IL (US); George H. Miley, Champaign, IL (US)

(73) Assignee: NPL Associates, Inc., Champaign, IL (US)

( * ) Notice: Subject to any disclaimer, the term of this patent is extended or adjusted under 35 U.S.C. 154(b) by 399 days.

This patent is subject to a terminal disclaimer.

(21) Appl. No.: 11/825,143

(22) Filed: Jul. 3, 2007

(65) Prior Publication Data

US 2008/0014477 A1    Jan. 17, 2008

Related U.S. Application Data

(63) Continuation of application No. 10/990,695, filed on Nov. 17, 2004, now Pat. No. 7,241,521.

(60) Provisional application No. 60/520,899, filed on Nov. 18, 2003.

(51) Int. Cl.
- *H01M 8/04* (2006.01)
- *H01M 2/14* (2006.01)
- *H01M 4/00* (2006.01)

(52) U.S. Cl. .............................. 429/17; 429/38; 429/40

(58) Field of Classification Search .................. 429/13, 429/17, 19, 30, 33, 34, 38, 40
See application file for complete search history.

(56) References Cited

U.S. PATENT DOCUMENTS

| | | | |
|---|---|---|---|
| 3,410,729 A | 11/1968 | Manion | |
| 3,525,643 A | 8/1970 | Ryhiner et al. | |
| 3,758,339 A | 9/1973 | Manion | |
| 3,839,091 A | 10/1974 | Bloomfield et al. | |

(Continued)

FOREIGN PATENT DOCUMENTS

EP        0 120 139 A2    10/1984

(Continued)

OTHER PUBLICATIONS

Swider-Lyons K E et al.; "Technical Issues and Opportunities for Fuel Cell Development for Autonomous Underwater Vehicles," Proc. on the 2002 Workshop on Autonomous Underwater Vehicles; IEEE, US, V. 15, No. 16, Jun. 20, 2002, pp. 61-64.

*Primary Examiner*—Patrick Ryan
*Assistant Examiner*—Thomas H. Parsons
(74) *Attorney, Agent, or Firm*—Krieg DeVault LLP; L. Scott Paynter

(57) ABSTRACT

One embodiment of the present invention includes a technique of performing a catalytic oxidation reaction at an anode to provide hydrogen ions from molecular hydrogen and a catalytic reduction reaction at a cathode to provide hydroxyl ions from liquid hydrogen peroxide. Passage of the molecular hydrogen to a reaction region is impeded with a proton exchange membrane and passage of the hydrogen peroxide to the reaction region is impeded with an ion-selective arrangement. Electric potential is generated between the anode and the cathode to provide electric power from a reaction of the hydrogen ions and the hydroxyl ions in the reaction region. In one variation, a regeneration technique is also provided.

17 Claims, 9 Drawing Sheets

U.S. PATENT DOCUMENTS

| | | | |
|---|---|---|---|
| 3,979,225 A | 9/1976 | Smith et al. |
| 3,981,745 A | 9/1976 | Stedman |
| 3,990,912 A | 11/1976 | Katz |
| 4,000,003 A | 12/1976 | Baker et al. |
| 4,068,042 A | 1/1978 | Chillier-Duchatel et al. |
| 4,128,701 A | 12/1978 | Maricle |
| 4,129,683 A | 12/1978 | Maricle |
| 4,396,687 A | 8/1983 | Kummer et al. |
| 4,407,902 A | 10/1983 | Kummer et al. |
| 4,436,711 A | 3/1984 | Olson |
| 4,436,713 A | 3/1984 | Olson |
| 4,528,250 A | 7/1985 | Struthers |
| 4,721,660 A | 1/1988 | Kujas |
| 4,783,381 A | 11/1988 | Tytgat et al. |
| 4,839,247 A | 6/1989 | Levy et al. |
| 5,208,112 A | 5/1992 | Ludwig et al. |
| 5,277,994 A | 1/1994 | Sprouse |
| 5,306,577 A | 4/1994 | Sprouse |
| 5,372,617 A | 12/1994 | Kerrebrock et al. |
| 5,376,470 A | 12/1994 | Sprouse |
| 5,407,756 A | 4/1995 | Sprouse |
| 5,506,066 A | 4/1996 | Sprouse |
| 5,510,202 A | 4/1996 | McCoy |
| 5,534,363 A | 7/1996 | Sprouse |
| 5,885,727 A | 3/1999 | Kawatsu |
| 6,245,214 B1 | 6/2001 | Rehg et al. |
| 6,277,509 B1 | 8/2001 | Wheeler |
| 6,338,912 B1 | 1/2002 | Ban et al. |
| 6,361,890 B1 | 3/2002 | Ban et al. |
| 6,399,231 B1 | 6/2002 | Donahue et al. |
| 6,403,243 B1 | 6/2002 | Herdeg et al. |
| 6,406,805 B1 | 6/2002 | James et al. |
| 6,425,746 B1 | 7/2002 | Mori et al. |
| 6,444,337 B1 | 9/2002 | Iyer |
| 6,485,851 B1 | 11/2002 | Narayanan et al. |
| 6,488,345 B1 | 12/2002 | Woody et al. |
| 6,500,571 B2 | 12/2002 | Liberatore et al. |
| 6,506,512 B1 | 1/2003 | Mori et al. |
| 6,554,877 B2 | 4/2003 | Finkelshtain et al. |
| 6,562,497 B2 | 5/2003 | Finkelshtain et al. |
| 6,579,638 B2 | 6/2003 | Brossard |
| 6,589,686 B2 | 7/2003 | Ovshinsky et al. |
| 6,589,922 B1 | 7/2003 | Dow et al. |
| 6,613,471 B2 | 7/2003 | Ovshinsky et al. |
| 6,641,945 B2 | 11/2003 | Griffin |
| 6,679,280 B1 | 1/2004 | Pinto |
| 6,696,185 B1 | 2/2004 | Okamoto |
| 6,727,012 B2 | 4/2004 | Chen et al. |
| 6,756,140 B1 | 6/2004 | McAlister |
| 6,758,871 B2 | 7/2004 | Finkelshtain et al. |
| 6,764,785 B2 | 7/2004 | Colborn et al. |
| 7,241,521 B2 | 7/2007 | Luo et al. |
| 2002/0015869 A1 | 2/2002 | Suda |
| 2002/0022165 A1 | 2/2002 | Brassard |
| 2002/0025467 A1 | 2/2002 | Staats |
| 2002/0036147 A1 | 3/2002 | Lehmann et al. |
| 2002/0064709 A1 | 5/2002 | Ovshinsky et al. |
| 2002/0068211 A1 | 6/2002 | Inoue et al. |
| 2002/0081480 A1 | 6/2002 | Inoue et al. |
| 2002/0083640 A1 | 7/2002 | Finkelshtain et al. |
| 2002/0094459 A1 | 7/2002 | Finkelshtain et al. |
| 2002/0098399 A1 | 7/2002 | Keppeler |
| 2002/0100682 A1 | 8/2002 | Kelley et al. |
| 2002/0127466 A1 | 9/2002 | Ovshinsky et al. |
| 2002/0142196 A1 | 10/2002 | Finkelshtain et al. |
| 2002/0168558 A1 | 11/2002 | Griffin |
| 2003/0022052 A1 | 1/2003 | Kearl |
| 2003/0031906 A1 | 2/2003 | Cargnelli et al. |
| 2003/0031911 A1 | 2/2003 | Ritts et al. |
| 2003/0035984 A1 | 2/2003 | Colborn |
| 2003/0039868 A1 | 2/2003 | Liberatore et al. |
| 2003/0049511 A1 | 3/2003 | Ritts et al. |
| 2003/0059664 A1 | 3/2003 | Menjak et al. |
| 2003/0077493 A1 | 4/2003 | Colborn et al. |
| 2003/0087141 A1 | 5/2003 | Sun et al. |
| 2003/0091876 A1 | 5/2003 | Rusta-Sellehy et al. |
| 2003/0091877 A1 | 5/2003 | Chen et al. |
| 2003/0091880 A1 | 5/2003 | Joos et al. |
| 2003/0113606 A1 | 6/2003 | Ritts et al. |
| 2003/0118878 A1 | 6/2003 | Pinto |
| 2003/0124418 A1 | 7/2003 | Dow et al. |
| 2003/0129459 A1 | 7/2003 | Ovshinsky et al. |
| 2003/0134172 A1 | 7/2003 | Grande et al. |
| 2003/0180596 A1 | 9/2003 | Yoshimura et al. |
| 2003/0190500 A1 | 10/2003 | Smedley et al. |
| 2003/0190507 A1 | 10/2003 | Docter et al. |
| 2003/0198849 A1 | 10/2003 | Hampden-Smith et al. |
| 2003/0203248 A1 | 10/2003 | Bruck et al. |
| 2003/0205641 A1 | 11/2003 | McElroy et al. |
| 2003/0207156 A1 | 11/2003 | Ovshinsky et al. |
| 2003/0207157 A1 | 11/2003 | Finkelshtain et al. |
| 2003/0228504 A1 | 12/2003 | Konrad et al. |
| 2004/0009390 A1 | 1/2004 | Roy et al. |
| 2004/0023086 A1 | 2/2004 | Su et al. |
| 2004/0043283 A1 | 3/2004 | Cipollini et al. |
| 2004/0052723 A1 | 3/2004 | Jorgensen |
| 2004/0053093 A1 | 3/2004 | Colborn et al. |
| 2004/0053132 A1 | 3/2004 | Smedley et al. |
| 2004/0072044 A1 | 4/2004 | Rusek et al. |
| 2004/0081859 A1 | 4/2004 | McElroy et al. |
| 2004/0093791 A1 | 5/2004 | Finkelshtain et al. |
| 2004/0110052 A1 | 6/2004 | Srinivas |
| 2004/0126313 A1 | 7/2004 | Haase |
| 2004/0126631 A1 | 7/2004 | Uchida et al. |
| 2004/0126632 A1 | 7/2004 | Pearson et al. |
| 2004/0126641 A1 | 7/2004 | Pearson et al. |
| 2004/0142219 A1 | 7/2004 | Morrissey et al. |
| 2004/0151977 A1 | 8/2004 | Morrisey et al. |
| 2004/0157101 A1 | 8/2004 | Smedley |
| 2004/0191594 A1 | 9/2004 | Kearl |
| 2004/0191597 A1 | 9/2004 | McElroy |

FOREIGN PATENT DOCUMENTS

| | | |
|---|---|---|
| EP | 0 120 139 A3 | 8/1986 |
| EP | 0 120 139 B1 | 7/1989 |
| EP | 0 472 922 A2 | 3/1992 |
| EP | 0 472 922 A3 | 9/1992 |
| EP | 0 540 913 A1 | 5/1993 |
| EP | 0 472 922 B1 | 9/1994 |
| EP | 0 540 913 B1 | 1/1996 |
| EP | 0 851 519 A1 | 7/1998 |
| EP | 0 807 321 B1 | 8/1998 |
| EP | 0 893 837 A1 | 1/1999 |
| EP | 0 893 837 B1 | 4/1999 |
| EP | 1 178 554 A2 | 2/2002 |
| EP | 1 282 183 A2 | 2/2003 |
| EP | 1 348 716 A1 | 10/2003 |
| EP | 1 383 196 A2 | 1/2004 |
| EP | 1 383 196 A3 | 1/2004 |
| EP | 1 403 953 A2 | 3/2004 |
| EP | 1 447 816 A1 | 8/2004 |
| EP | 1 463 140 A2 | 9/2004 |
| EP | 0 851 519 B1 | 10/2004 |
| JP | 60-081774 | 5/1985 |
| WO | WO 98/06145 A1 | 2/1998 |
| WO | WO 01/65621 A1 | 9/2001 |
| WO | WO 02/45196 A2 | 6/2002 |
| WO | WO 02/054506 A2 | 7/2002 |
| WO | WO 02/086999 A1 | 10/2002 |
| WO | WO 03/034524 A2 | 4/2003 |
| WO | WO 03/050896 A2 | 6/2003 |
| WO | WO 03/050897 A2 | 6/2003 |
| WO | WO 03/054995 A1 | 7/2003 |

| | | |
|---|---|---|
| WO | WO 03/061041 A2 | 7/2003 |
| WO | WO 03/088392 A2 | 10/2003 |
| WO | WO 2004/021486 A2 | 3/2004 |
| WO | WO 2004/025754 A2 | 3/2004 |
| WO | WO 2004/025760 A1 | 3/2004 |
| WO | WO 2004/032306 A2 | 4/2004 |
| WO | WO 2004/036055 A2 | 4/2004 |
| WO | WO 2004/038886 A2 | 5/2004 |
| WO | WO 2005/050758 A2 | 6/2005 |

HYDROGEN/HYDROGEN PEROXIDE FUEL CELL

CROSS-REFERENCE TO RELATED APPLICATIONS

The present application is a continuation of U.S. patent application Ser. No. 10/990,695 Nov. 17, 2004 (now U.S. Pat. No. 7,241,521), which claims the benefit of U.S. Provisional Patent Application No. 60/520,899 filed Nov. 18, 2003. U.S. Provisional Patent Application No. 60/520,899 filed Nov. 18, 2003 and U.S. application Ser. No. 10/990,695 filed Nov. 17, 2004 (now U.S. Pat. No. 7,241,521)are each hereby incorporated by reference in their entirety.

BACKGROUND

The present invention relates to fuel cells, and more particularly, but not exclusively relates to electrochemical fuel cells for which reduction reactions occur at the cathode side using hydrogen peroxide. This reduction process, when combined with the oxidization reaction at the anode side, generates electrical energy.

Aluminum-hydrogen peroxide ($Al/H_2O_2$) semi fuel cells have been studied for underwater propulsion. The existing problem with the $Al/H_2O_2$ semi fuel cell is that the energy density is still lower than desired for many applications—particularly space propulsion implementations. While hydrogen peroxide $H_2O_2$ is used indirectly to generate oxygen gas for utilization at the cathode, there are significant difficulties from doing so. For example, in a fuel cell using air or oxygen on the cathode side, the oxygen joins the reduction reaction in a gaseous form. Because the mass density achievable in this gas phase is ordinarily a thousand times less than that available in a liquid phase, the area current density is at least 100 times less from this limiting factor alone. To address this issue, ordinary fuel cells typically use a compressor to pressurize the air/$O_2$ to a few Bars. Even so, the current density is still at least 30 times less than the liquid phase counterpart. The additional weight and energy requirement of the pressurizing system also represent performance penalties.

Furthermore, the mass transport of the reactants in such fuel cells is a two-phase process. In a proton exchange membrane fuel cell in particular, the two-phase transport of reactant and product species can be a limiting phenomenon of fuel cell operation. Particularly, at high current densities, transport of oxygen to the catalyst affects the oxygen reduction reaction rate in the cathode. Furthermore, the water generated in cathode reaction condenses when water vapor exceeds the saturation pressure, and blocks the open pores of the gas diffusion layer, further limiting reactant transport.

The slow kinetics of oxygen reduction has also been identified as a factor limiting the current density and the overall energy conversion efficiency of an oxygen fuel cell system. The oxygen reduction reaction at the cathode is written as: $O_2 + 4 H^+ + 4 e \rightarrow 2 H_2O$. This reaction involves four electrons simultaneously, and therefore has a low probability of occurrence. Alternatively the poor kinetics of the oxygen reduction reaction can also be attributed to the low exchange current density of the oxygen reduction reaction. The high cathodic overpotential loss of 220 mV, at potentials close to the open circuit, observed in the current low Pt loading electrocatalyst, is due to a mixed potential that is set up at the oxygen electrode. This mixed potential is from a combination of slow $O_2$-reduction kinetics and competing anodic processes such as Pt-oxide formation and/or impurity oxidation. Further, the low exchange current density of the $O_2$-reduction reaction results in a semi-exponential, Tafel-like behavior—indicating that the reaction is activation controlled over a range of three orders of magnitude in current density. It has been found that the exchange current density of $O_2$-reduction is 6 orders of magnitude lower than that of $H_2$-oxidation reaction. Thus, there are numerous limitations associated with oxygen gas reduction at a fuel cell cathode.

Accordingly, there is a need for further contributions in this area of technology.

SUMMARY

One embodiment of the present invention is a unique fuel cell. Other embodiments include unique apparatus, methods, devices, and systems relating to fuel cells.

A further embodiment includes: performing an oxidation reaction at an anode to convert molecular hydrogen to hydrogen ions and a reduction reaction at a cathode to convert liquid hydrogen peroxide to hydroxyl ions, impeding passage of the molecular hydrogen to a reaction region relative to hydrogen ions, and impeding passage of the hydrogen peroxide to the reaction region relative to the hydroxyl ions. An electric potential is generated between the anode and the cathode to provide electric power from a reaction of the hydrogen ions and the hydroxyl ions in the reaction region. In one form, the oxidation reaction and/or reduction reaction are catalytic. Alternatively or additionally, the passage of the molecular hydrogen is impeded by a proton exchange membrane and/or the passage of the hydrogen peroxide is impeded by an ion-selective arrangement.

In yet a further embodiment, an apparatus includes a source to supply molecular hydrogen, a source to supply hydrogen peroxide, and a fuel cell. The fuel cell comprises: an anode subassembly coupled to the first source that includes an anode with one catalyst and a proton exchange membrane to convert at least a portion of the molecular hydrogen from the first source into hydrogen ions, a cathode subassembly coupled to the source of hydrogen peroxide that includes a cathode with a another catalyst and an ion-selective arrangement to convert at least a portion of the hydrogen peroxide from the second source into hydroxyl ions, and a reaction region separating the anode subassembly and the cathode subassembly and being positioned between the proton exchange membrane and the ion selective-arrangement to receive hydrogen ions from the anode subassembly and hydroxyl ions from the cathode subassembly.

For one nonlimiting form of this apparatus, the fuel cell is effective to generate an electric potential between the anode and the cathode to provide electrical power by reaction of the hydrogen ions and the hydroxyl ions when in the reaction region, the proton exchange membrane is selective to the passage of hydrogen ions therethrough relative to molecular hydrogen, the ion-selective arrangement includes an ion-selective membrane and a molecular sieve layer, and/or the ion-selective membrane is selective to the passage of hydroxyl ions relative to hydrogen peroxide molecules.

Still another embodiment includes: performing a catalytic oxidation reaction at an anode to convert a hydride to hydrogen ions, impeding passage of the hydride to a cathode relative to the hydrogen ions with a proton exchange membrane, performing a catalytic reduction reaction at a cathode to convert hydrogen peroxide to hydroxyl ions, and reacting the hydrogen ions and the hydroxyl ions to provide electricity. Optionally, this embodiment may further include another anode to provide regenerated hydride when an appropriate electric potential is placed across both anodes and/or another cathode to provide regenerated hydrogen peroxide when another appropriate electric potential is placed across both cathodes.

In yet another embodiment, a fuel cell includes: a discharge anode with a first catalyst to convert at least a portion of a source material into hydrogen ions, a discharge cathode with a second catalyst to convert hydrogen peroxide into hydroxyl ions, a proton exchange membrane separating the discharge anode and cathode that is selective to passage of hydrogen ions relative to the hydride to facilitate performance of a reaction between the hydrogen ions and the hydroxyl ions to produce electricity. The fuel cell further includes a regeneration negative electrode coupled with a third catalyst to provide regenerated source material when a selected electric potential is applied between the discharge anode and the regeneration negative electrode. Alternatively or additionally, the fuel cell further includes a regeneration positive electrode with a fourth catalyst to provide regenerated hydrogen peroxide when a suitable electric potential is applied between the discharge cathode and the regeneration positive electrode. In one particular nonlimiting form, the source material includes a hydride from which the hydrogen ions are generated.

Another embodiment comprises: discharging electricity from a fuel cell by performing a first catalytic oxidation reaction with a discharge anode of the fuel cell to generate hydrogen ions from a source material, passing at least a portion of the hydrogen ions through a proton exchange membrane of the fuel cell, performing a first catalytic reduction reaction with a discharge cathode of the fuel cell to generate hydroxyl ions from hydrogen peroxide, and performing a reaction with the hydrogen ions and the hydroxyl ions to generate an electric potential between the discharge anode and the discharge cathode to provide the electricity; and recharging the fuel cell by performing at least one of: (a) applying an electric potential to a regeneration negative electrode of the fuel cell to provide a second catalytic reduction reaction for regeneration of source material and (b) applying an electric potential to a regeneration positive electrode of the fuel cell to provide a second catalytic oxidation reaction for regeneration of hydrogen peroxide.

Accordingly, one object of the present invention is to provide a unique fuel cell.

Another object of the present invention is to provide a unique apparatus, method, device, or system relating to fuel cells.

Further objects, embodiments, forms, aspects, benefits, advantages, and features shall become apparent from the figures and description provided herewith.

DETAILED DESCRIPTION

Figure 1:
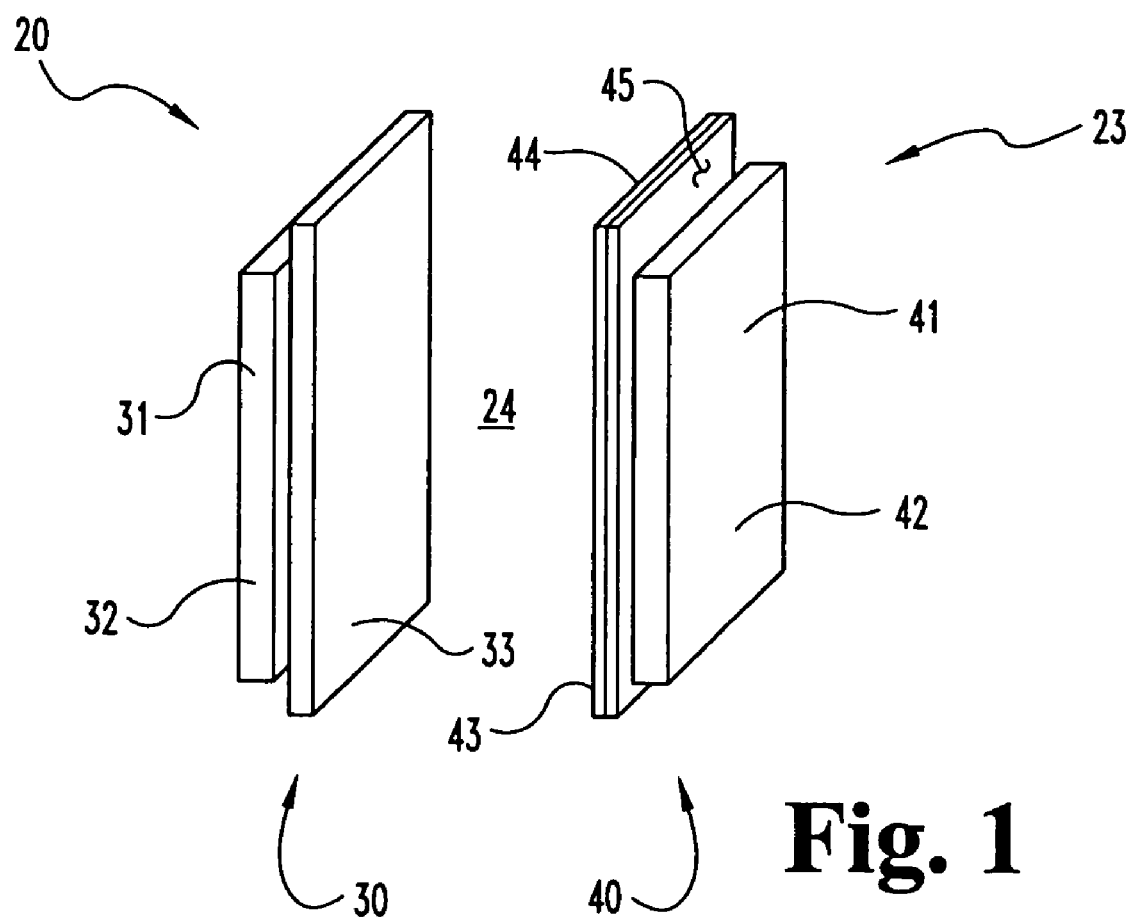
FIG. 1 is a perspective, partially schematic view of a fuel cell device where a reaction region separates anode and cathode subassemblies.

While the present invention may be embodied in many different forms, for the purpose of promoting an understanding of the principles of the present invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the present invention as described herein are contemplated as would normally occur to one skilled in the art to which the invention relates.

One embodiment of the present application is directed to providing a hydrogen/hydrogen peroxide ($H_2/H_2O_2$) fuel cell that uses $H_2O_2$ directly at the cathode, rather than oxygen gas. Under certain circumstances, this unique technique can reduce energy loss and weight penalty compared to other schemes based on the catalytic decomposition of $H_2O_2$. In one form, the fuel cell is implemented in an air-independent application and/or, the hydrogen gas ($H_2$) is provided with a water/hydride reactant-based generator. Another embodiment of the present application is directed to a fuel cell that oxidizes hydride directly at the anode instead of hydrogen. One nonlimiting form of this embodiment is a $NaBH_4/H_2O_2$ fuel cell.

FIG. 1 depicts another embodiment of the present application in the form of $H_2/H_2O_2$ fuel cell device 20. Fuel cell device 20 includes fuel cell 23 that has anode subassembly 30 opposite cathode subassembly 40, both subassemblies being separated by reaction region 24. Anode subassembly 30 includes a porous anode 31 that includes oxidation catalyst 32, such as platinum (Pt) or a compound/alloy including Pt, to name just a few examples. Anode subassembly 30 also includes Proton Exchange Membrane (PEM) 33 disposed proximate to anode 31. Anode 31 receives hydrogen gas ($H_2$) in molecular form for oxidation at anode 31 to produce protons ($H^+$), and correspondingly provides such protons to reaction region 24 through PEM 33. One or more hydrides can be used to generate this $H_2$ gas by reacting such hydrides with water, as is more fully described hereinafter.

Cathode subassembly 40 includes porous cathode 41 that includes reduction catalyst 42, which can be iron (Fe), palladium (Pd), or a compound/alloy including Fe and/or Pd, to name just a few examples. Cathode subassembly 40 also has ion-selective arrangement 43 that includes molecular sieve layer 45 and ion-selective membrane 44. Molecular sieve layer 45 is positioned between cathode 41 and ion-selective membrane 44, and is arranged to present a barrier to hydrogen peroxide molecules, while permitting passage of hydroxyl ions. Ion-selective membrane 44 provides hydroxyl ions ($OH^-$) to reaction region 24 through sieve layer 45. In reaction region 24, the protons ($H^+$) from anode subassembly 30 and the hydroxyl ions ($OH^-$) from cathode subassembly 40 combine to provide water. Cell devices 20 can include valves, metering controls, and/or sensors to regulate operation thereof as more fully described hereinafter.

For fuel cell device 20, the hydrogen peroxide ($H_2O_2$) is directly used in cathode 41. This technique is in contrast to schemes in which $H_2O_2$ was first decomposed and then the resulting $O_2$ gas was utilized in a $H_2/O_2$ fuel cell. By utilizing this liquid phase reactant, significantly greater efficiencies can be realized compared to standard oxygen gas-based fuel cells. At cathode 41, the hydrogen peroxide is reduced according to the reaction: $H_2O_2 + 2\ e^- \rightarrow 2\ OH^-$. Compared to oxygen gas reduction, this hydrogen peroxide reduction is a two-electron transfer process rather than a 4-electron transfer process, and involves a much lower activation barrier. Furthermore, the arrangement of fuel cell 23 at least partially compensates for loss due to the overpotential based on the direct cathodic reduction of oxygen gas.

Figure 2:
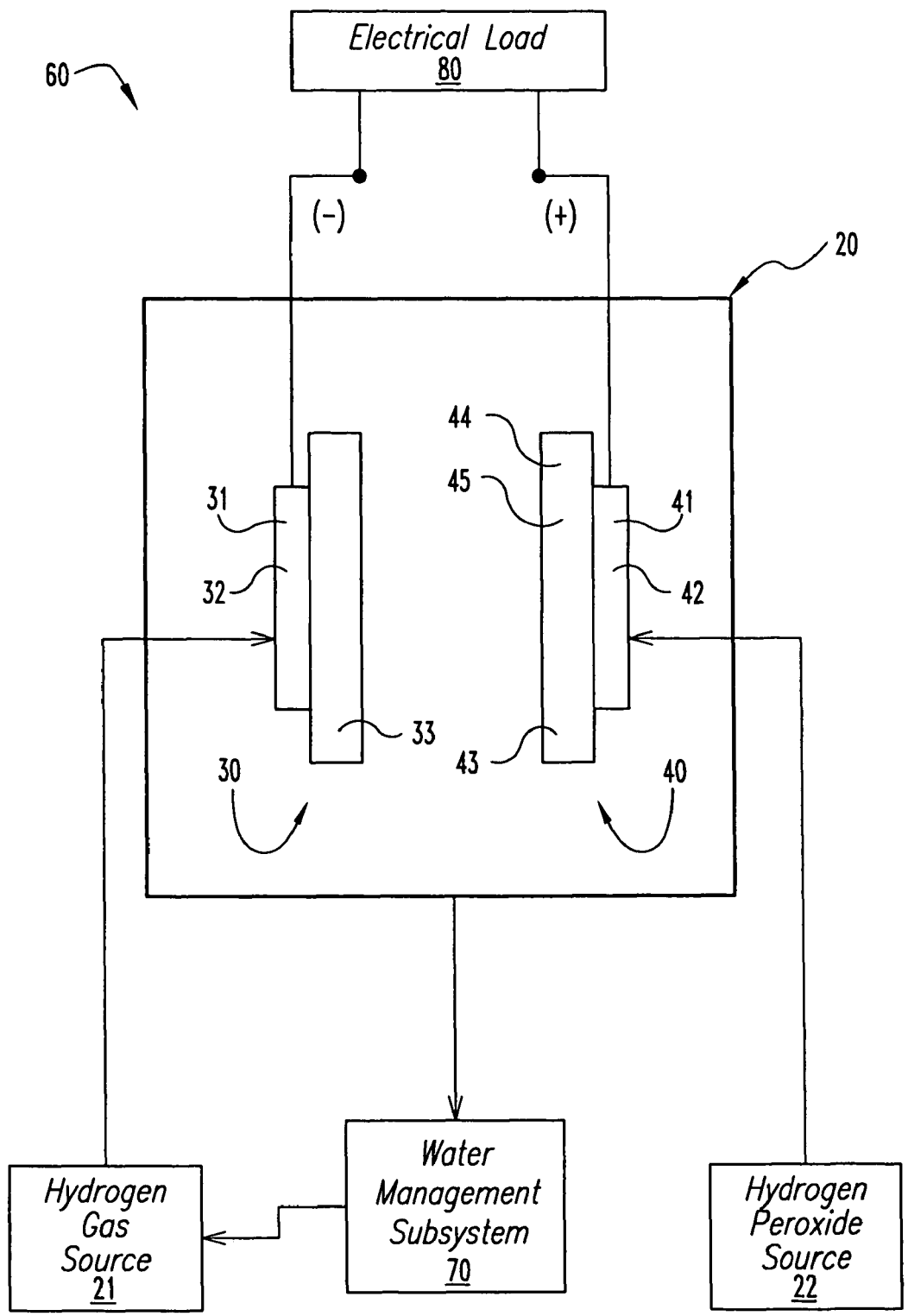
FIG. 2 is a schematic block diagram of a power generation system that utilizes at least one of the fuel cell devices of FIG. 1.

Referring additionally to FIG. 2, a power generation system 60 is illustrated that includes one or more of fuel cell devices 20; where like reference numerals refer to like features previously described in connection with FIG. 1. System 60 further includes source 21 to supply molecular hydrogen gas (an oxidation source material) and source 22 to supply hydrogen peroxide (a reduction source material). Source 21 may be arranged to provide molecular hydrogen in a selected phase (such as a gas or liquid) and/or comprise a hydrogen gas generator.

Source 21 is in fluid communication with anode subassembly 30. Correspondingly, source 21 can directly supply molecular hydrogen gas to subassembly 30 and/or indirectly supply molecular hydrogen by reaction of a source material for a hydrogen gas generator form. By way of nonlimiting example, a hydrogen gas generator form of source 21 provides hydrogen gas by reacting a metallic hydride with water, such that the hydride is the source material from which hydrogen is provided. In one specific instance, a hydrogen gas generator is based on the reaction: $2H_2O + MgH_2 = Mg(OH)_2 + H_2$. Source 21 can include valves, metering controls, and/or sensors to regulate the supply/generation of hydrogen for the one or more fuel cell devices 20 as appropriate.

Regardless of type of source, the molecular hydrogen gas from source 21 is supplied to one or more fuel cell devices 20. Further, source 22 is in fluid communication with cathode subassembly 40 of each of the one or more fuel cell devices 20 to supply hydrogen peroxide thereto in liquid form. Water management subsystem 70 is in fluid communication with one or more fuel cells devices 20 to receive water produced by the one or more devices 20 during operation. Appropriate valves, metering controls, and/or sensors to regulate the supply of hydrogen peroxide and water can be included in source 22 and/or water management subsystem 70, respectively. Also, it should be appreciated that some or all of the water utilized in source 21 to generate hydrogen gas can be provided from water management subsystem 70.

Referring to FIGS. 1 and 2 generally, operation of device 20 and system 60 is next described. Hydrogen gas is processed by catalytic reaction at anode subassembly 30 of device 20 to provide protons, and hydrogen peroxide is processed by catalytic reaction at cathode subassembly 40 to provide hydroxyl ions. The resulting protons from anode 31 pass through PEM 33 to reaction region 24, and the resulting hydroxyl ions from cathode 41 pass through sieve 45 and ion-selective membrane 44 to reaction region 24. In reaction region 24, the protons and hydroxyl ions react by combining to form water. Correspondingly, an electric potential develops across anode 31 and cathode 41, which can be applied to an electrical load 80 to provide electricity therefor.

In one embodiment, system 60 and/or device 20 is provided in a spacecraft. In another embodiment, system 60 and/or device 20 is included in a submersible underwater vehicle. In still other embodiments, system 60 and/or device 20 is utilized in one or more different "air-independent" applications; where "air independent" applications are those based on reactions that do not rely on air to provide one or more reactants, such as oxygen. Yet other embodiments utilize system 60 and/or device 20 with or without air-independence.

Fuel cell device 20 shown in FIG. 1 has independent molecular sieve layer 45 and ion-selective membrane 44 to reduce cross-over of hydrogen peroxide to anode subassembly 30. For some applications, a different geometry and/or structure of a $H_2/H_2O_2$ fuel cell may be desired. For example, in practice a fuel cell typically is structured as a stack of fuel cells to generate a desired electrical output, which often favors a thin, compact fuel cell construction that can be readily stacked together.

Figure 3:
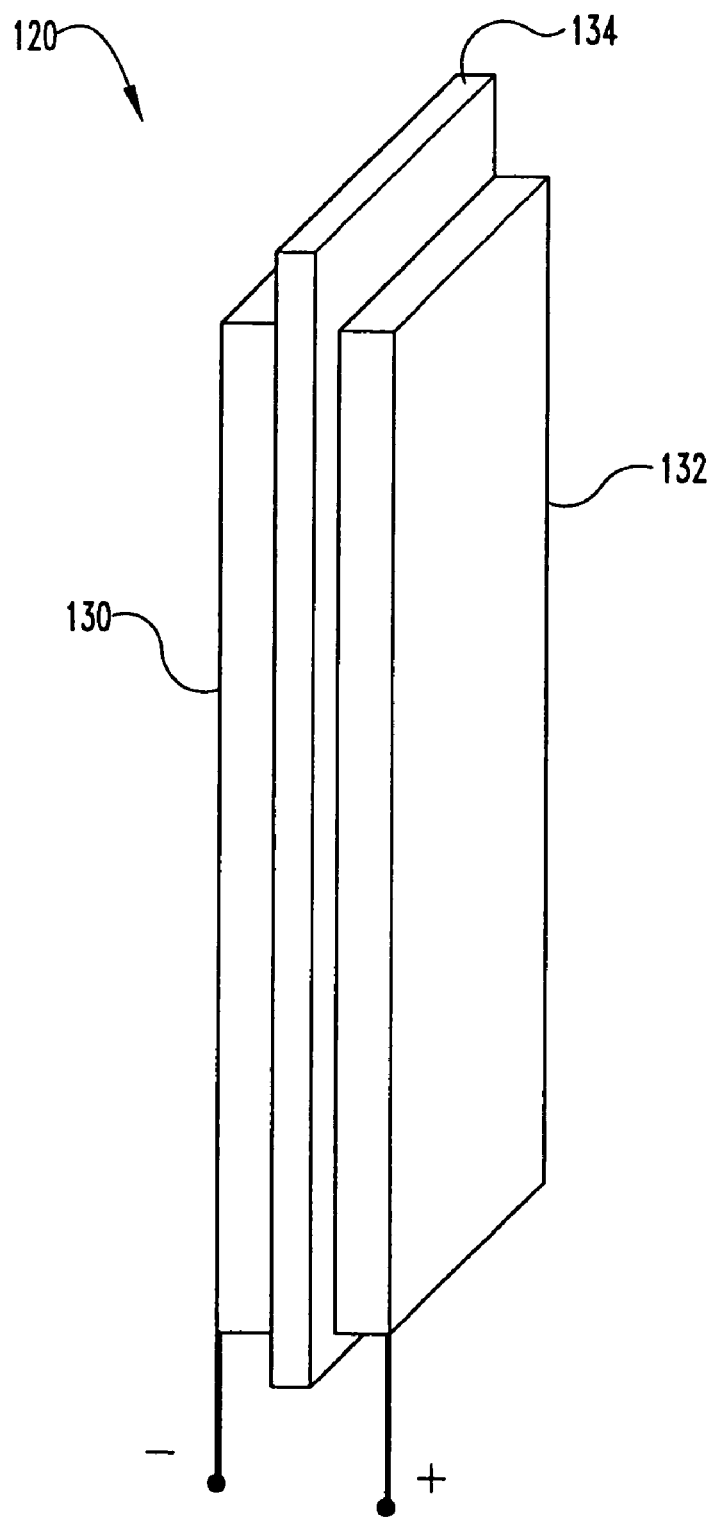
FIG. 3 is a perspective view of another fuel cell device.

FIG. 3 depicts an exploded perspective view of one type of compact fuel cell device 120. Fuel cell device 120 includes fuel cell 121 that has porous anode 130 and porous cathode 132. Cathode 132 is hydrophilically treated to attract water produced by the electrochemical reaction. Proton exchange membrane 134 separates anode 130 and cathode 132. Anode 130 includes oxidation catalyst 131, such as any of those previously described. Anode 130 receives hydrogen gas ($H_2$) in molecular form for oxidation, and correspondingly provides protons ($H^+$) through PEM 134. One or more metallic hydrides can be used to generate $H_2$ gas by reacting such hydrides with water, as previously explained.

Cathode 132 includes reduction catalyst 133, such as any of those previously described. Proton exchange membrane 134 includes molecular sieve element 135, which presents a barrier to hydrogen peroxide molecules. In one embodiment of PEM 134 with molecular sieve element 135, Nafion (a perfluorinated sulfonic acid polymer) is utilized that has a number of microporous water channels with size on the scale of tens of nanometers. Another PEM comprises an aromatic polyimide polymer. By mixing a suitable amount of nanoscale molecular sieve powder with Nafion solution in a PEM casting process, the molecular sieve (MS) particles precipitate into the PEM water channel. When used in peroxide fuel cells, the MS particles act as a barrier against peroxide crossover.

Continuing with FIG. 3, operation of device 120 is next described. Hydrogen gas is catalytically processed at anode 130 of device 120 to provide protons through PEM 134, and hydrogen peroxide is catalytically reduced at cathode 132 to react with such protons to provide an electrical potential between anode 130 and cathode 132. Anode 130 and cathode 132 can be coupled across an electrical load to provide electricity thereto. For the depicted arrangement of device 120, reaction tends to predominantly occur nearest cathode 132 because of its hydrophilic treatment, so that an ion-selective membrane is not typically required.

Figure 4:
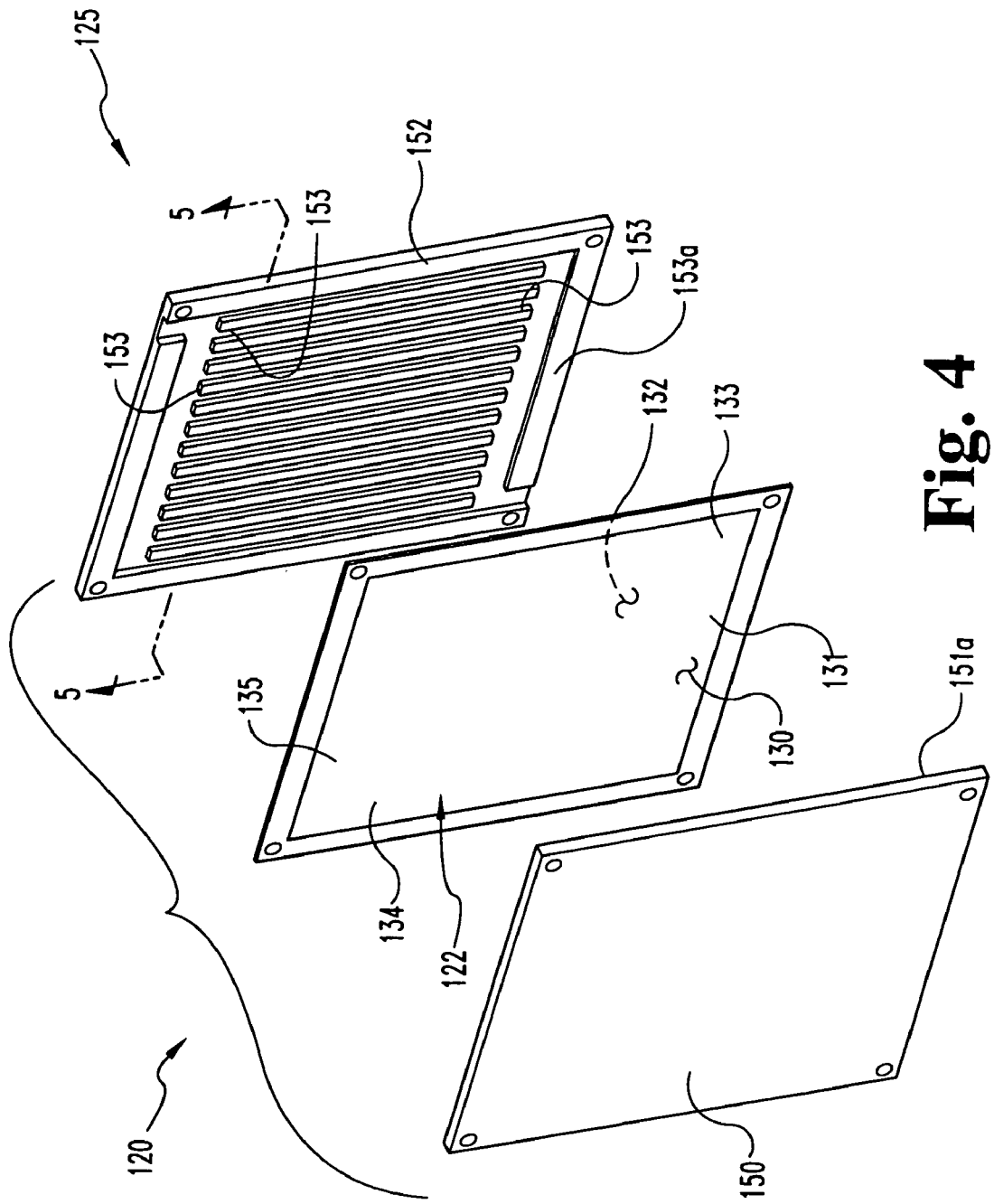
FIG. 4 is a perspective, exploded view of a fuel cell device assembly corresponding to the fuel cell device of FIG. 3.
Figure 5:
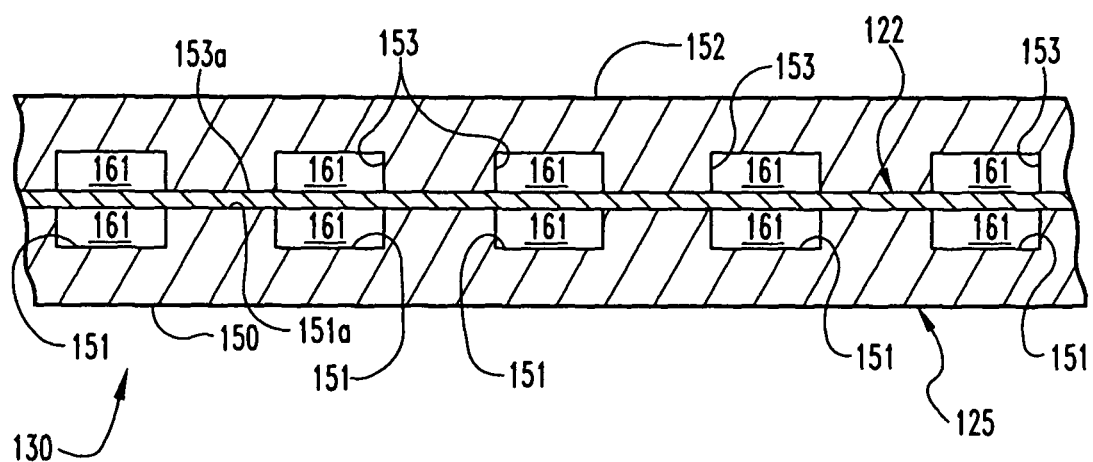
FIG. 5 is a partial sectional view of the fuel cell assembly of FIG. 4 taken along the view line 5-5 shown in FIG. 4.

It should be appreciated that FIG. 3 shows fuel cell device 120 in a schematic form to enhance understanding of its features and operation. Referring additionally to FIGS. 4 and 5, one implementation of device 120 is depicted as fuel cell assembly 125. Assembly 125 is relatively thin and compact, and is arranged to be stacked with a number of like units to collectively provide a desired electric power source. FIG. 4 provides an exploded view of assembly 125, and FIG. 5 provides a cross-sectional view after assembling device 120 to provide assembly 125. This sectional view corresponds to section line 5-5 depicted in FIG. 4.

As shown in FIGS. 4 and 5, anode 130 and cathode 132 of device 120 are attached (e.g., by hot pressing) to PEM 134 to collectively form Membrane Electrode Assembly (MEA) 122. Anode flow field plate 150 and cathode flow field plate 152 are positioned on opposite sides of the MEA 122 to make electrical contact therewith. Plates 150 and 152 each contain respective grooves 151 and 153, on corresponding inner plate faces 151a and 153a. Grooves 151 of face 151a are not visible in the perspective view of FIG. 4. As best illustrated in FIG. 5, when plates 150 and 152 are assembled on opposing sides of MEA 122, grooves 151 and 153 are disposed to form channels 161 through which reactants circulate and flow to make fluid contact with anode 130 and cathode 132 (collectively electrodes ) of MEA 122.

Yet another embodiment of the present invention is directed to providing a hydride directly in an anode in a hydride/$H_2O_2$ fuel cell arrangement. In a preferred example, a $NaBH_4/H_2O_2$ fuel cell uses $NaBH_4$ directly in the anode, rather than hydrogen gas. For this example, it should be noted that $NaBH_4$ is generally soluble in water so it can be supplied for oxidation by an anode in aqueous solution. Correspondingly, both fuel and the oxidizer are subject to reaction in the liquid phase. Under certain circumstances, this unique technique can reduce energy loss and weight penalty compared to other gas-based fuel cell arrangements.

Generally, this liquid/liquid fuel cell arrangement can be implemented with device 120 and assembly 125 previously described. For a fuel cell 120 and corresponding assembly 125 based on $NaBH_4/H_2O_2$ in particular, one embodiment prepares anode 130 from a porous carbon paste mixed with a powder form of an appropriate catalyst, such as platinum (Pt) or a compound/alloy including Pt, to name just a few examples. Further, anode 130 for this embodiment is also hydrophilic-treated so that the aqueous solution including $NaBH_4$ can permeate PEM 134. For arrangements of this kind, the balanced pressure and matched mass density at the anode and cathode can reduce the reactant cross-over. At the anode, the reaction proceeds according to: $NaBH_4 + 2 H_2O \rightarrow NaBO_2 + 8 H^+ + 8 e$. The protons then transfer through the PEM and react with the peroxide at the cathode according to $H_2O_2 + 2 H^+ + 2 e \rightarrow 2 H_2O$.

Figure 6:
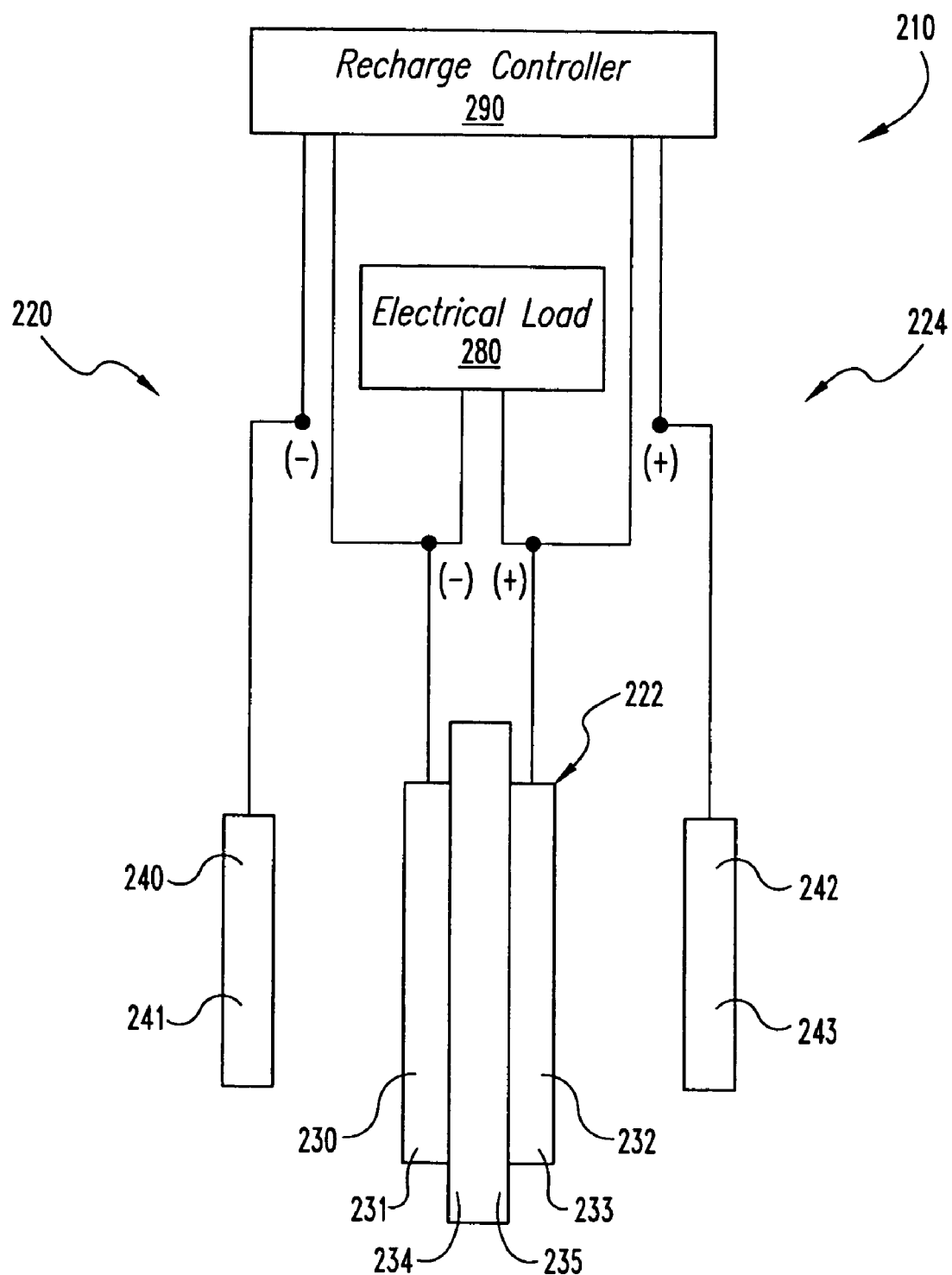
FIG. 6 is a schematic block diagram view of a fuel cell system that includes yet another fuel cell device that is regenerative.

In a further embodiment of the present application, a 4-electrode "tetrode" fuel cell is illustrated in fuel cell system 210 of FIG. 6. For this arrangement, it has been found that regeneration of a fuel cell can be enhanced under certain circumstances by providing a regeneration negative electrode and cathode of different materials compared to the materials used to make the discharge anode and cathode, respectively. For a $NaBH_4/H_2O_2$ type of fuel cell, the regeneration reaction typically desired is: $NaBO_2 + 6H_2O \rightarrow NaBH_4 + 4H_2O_2$, with a thermodynamic potential of about 2.2V. From a theoretical standpoint, regeneration based on this reaction is less likely to occur than undesired oxygen/hydrogen evolution reactions, such as: $2H_2O \rightarrow 2H_2 + O_2$, (thermodynamic potential of about 1.23V) because the desired regeneration reaction has a higher thermodynamic potential (2.2V>1.23V). However, it has been found that electrochemical reactions involving gas evolution can have over-potentials dependent on the electrode material. Correspondingly, the applied voltage for the undesired reaction can be manipulated by electrode material selection in at least some cases. For example, a hydrogen evolution reaction has an over-potential of 0V on a palladium metal electrode but it is greater than 0.5V on an indium coated electrode. On the other hand, an oxygen evolution reaction has a small over-potential of 0.3 V on an $IrO_2$ electrode but it increases to 0.6 V for a Pt metal electrode. For the $NaBH_4/H_2O_2$ type of fuel cell, the discharge cathode (positive electrode in the fuel cell operation) can be made of Pt or transition metal oxides ($Ni(OH)_2$ for example) while the discharge anode (the negative electrode in the fuel cell operation) can be made of Pt or PdO. For this selection of discharge electrode materials, a regeneration (recharge) anode includes an indium coating and the regeneration positive electrode includes a Pt or glassy carbon coated surface.

Figure 7:
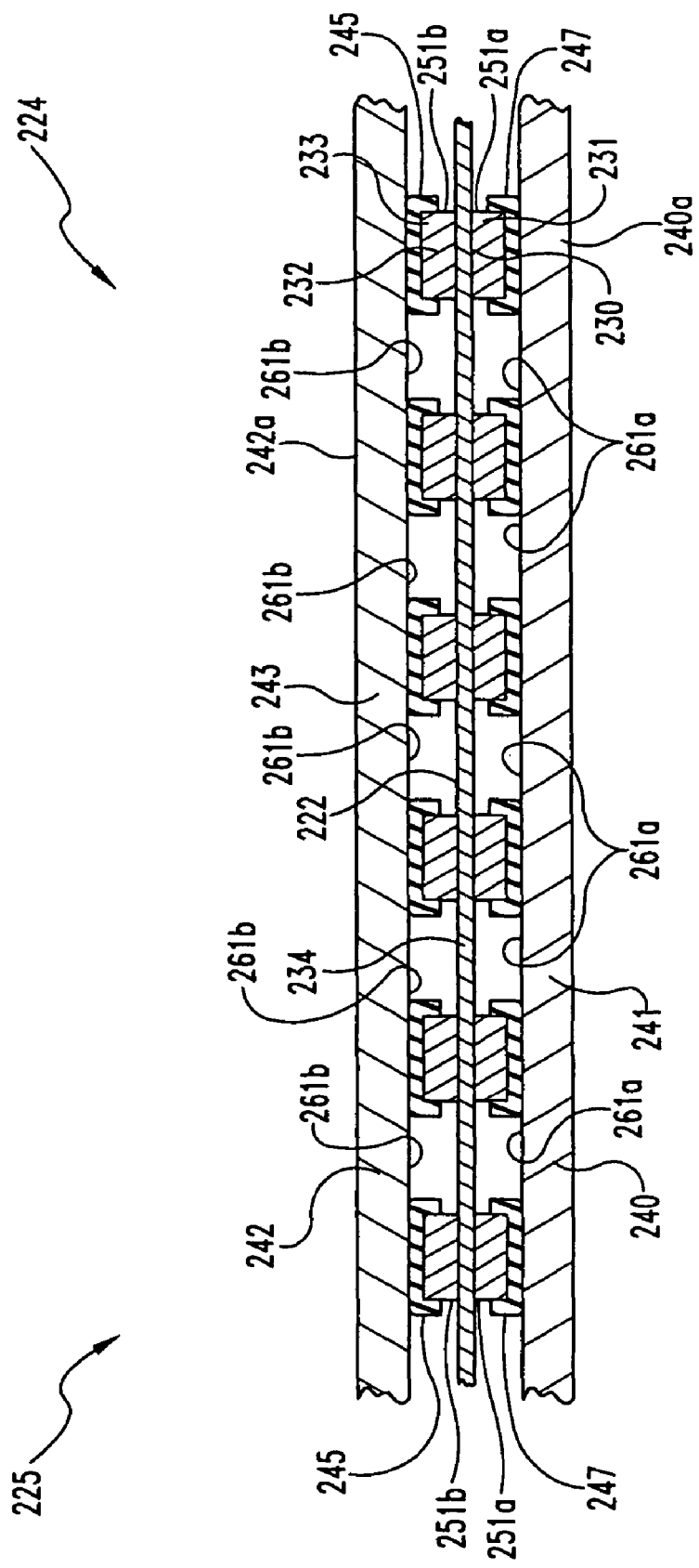
FIG. 7 is partial sectional view of the regenerative fuel cell device shown in FIG. 6.

FIGS. 6 and 7 depict tetrode fuel cell device 220 directed to fuel cell operation of the $NaBH_4/H_2O_2$ type; where like reference numerals refer to like features previously described. Device 220 includes fuel cell 224. Referring specifically to system 210 of FIG. 6, fuel cell 224 has porous discharge anode 230 and porous discharge cathode 232 that are separated by proton exchange membrane (PEM) 234. Discharge anode 230, discharge cathode 232, and PEM 234 are coupled together to form MEA 222. Anode 230 is prepared from a porous carbon paste mixed with an oxidation catalyst 231 in powder form. For this embodiment, catalyst 231 is platinum (Pt) or a compound/alloy including Pt; however, it can vary in other embodiments. Anode 230 receives a hydride in aqueous solution for oxidation and correspondingly provides protons ($H^+$) through PEM 234. In one nonlimiting embodiment, the hydride is $NaBH_4$. Accordingly, for such embodiments, anode 230 is hydrophilic-treated so an aqueous solution of $NaBH_4$ can permeate it.

Cathode 232 includes reduction catalyst 233, Catalyst 233 is iron (Fe), palladium (Pd), or a compound/alloy including Fe and/or Pd; however, it can vary in other embodiments. Proton exchange membrane 234 is prepared with an integral molecular sieve element 235 like PEM 134 with element 135, as described in connection with FIG. 3, which in turn is combined with anode 230 and cathode 232 to provide MEA 222. This integral molecular sieve arrangement presents a barrier to hydrogen peroxide molecules. Device 220 can include valves, metering controls, and/or sensors to regulate operation thereof as more fully described hereinafter.

Fuel cell 224 further includes regeneration negative electrode 240 and regeneration positive electrode 242. Negative electrode 240 and positive electrode 242 are positioned on opposite sides of PEM 234 and are separated from PEM 234 by anode 230 and cathode 232, respectively. Negative electrode 240 includes hydride regeneration catalyst 241. Catalyst 241 includes an indium (In) coating, but can vary in other embodiments. Positive electrode 242 includes peroxide regeneration catalyst 244. In one form, catalyst 244 includes platinum (Pt) or glassy carbon, but can vary in other embodiments.

It should be appreciated that FIG. 6 depicts device 220 in a schematic form to enhance understanding of its features and operation. FIG. 7 illustrates a partial cross-section of one implementation of device 220 as fuel cell assembly 225. This cross-sectional view corresponds to the sectional view of assembly 125 shown in FIG. 5, and otherwise may externally appear the same as assembly 125; however, there are internal distinctions due to its tetrode configuration that shall become apparent from the following description. Correspondingly, assembly 225 can be provided in a relatively compact form arranged for stacking with a number of like units to provide a desired electric power source.

Referring to both FIGS. 6 and 7, anode 230 and cathode 232 are coupled on opposite sides of MEA 222 as a series of generally parallel electrode bars 251a and 251b, respectively. Bars 251a and 251b are separated from one another by corresponding flow channels 261a and 261b. Bars 251a are electrically connected together in a standard manner to provide anode 230, and bars 251b are each electrically connected together in a standard manner to provide cathode 232 (not shown in FIG. 7). Flow channels 261a facilitate the circulation of $NaBH_4$ in aqueous solution for oxidation with anode 230, and flow channels 261b facilitate the circulation of $H_2O_2$ for reduction with cathode 232.

Anode 230 and cathode 232 are positioned between regeneration negative electrode 240 in the form of plate 240a and regeneration positive electrode 242 in the form of plate 242a. Accordingly, MEA 222 is positioned between anode 230 and cathode 232, anode 230 is positioned between negative electrode 240 and MEA 222, cathode 232 is positioned between positive electrode 242 and MEA 222, and correspondingly each of anode 230 and cathode 232 is positioned between negative electrode 240 and positive electrode 242. Anode 230 is electrically insulated from regeneration negative electrode 240 by insulation layer 245, and regeneration positive electrode 232 is electrically insulated from cathode 242 by insulation layer 247. In one nonlimiting form, insulation layer 245 and insulation layer 247 are formed from an electrically nonconductive epoxy; however, in other embodiments, a different type of insulation material could be utilized.

During operation of fuel cell device 220 (either discharge or recharge), catholyte containing hydrogen peroxide flows through channels 261b, and anolyte containing $NaBH_4$ flows through channels 261a. When discharging device 220, anode 230 and cathode 232 provide negative and positive contacts, respectively for electricity conduction through electrical load 280 as shown in FIG. 6. During discharge, regeneration negative electrode 240 and positive electrode 242 could be electrically floating (i.e., not electrically connected or grounded relative to the remainder of device 220). Alternatively, negative electrode 240 could be short-circuited to anode 230 to reduce possible corrosion of indium coating during the discharge.

During recharge, recharge controller 290 provides an appropriate electric potential across negative electrode 240 and positive electrode 242 to regenerate hydrogen peroxide (catholyte) and $NaBH_4$ (anolyte). The surface of positive electrode 242 in contact with the catholyte comprises a high-$O_2$-over-potential material, which in this case is a Pt metal or glassy carbon coating, while the surface of negative electrode 240 in contact with the anolyte comprises a high-$H_2$-over-potential material, which in this case is an In metal coating. For an embodiment with this material configuration, controller 290 can be configured to clamp the voltage between anode 230 and cathode 232 at about 1V during recharge. Also during recharge, it is desirable to control the potential of anode 230 and cathode 232 to: (a) reduce possible electrode corrosion and (b) facilitate the transport of protons through MEA 222. Accordingly, in one embodiment, controller 290 provides about a +0.7V potential difference between positive electrode 242 and cathode 232 (positive electrode 242 being more positive than cathode 232) and about a −0.7V potential difference between negative electrode 240 and anode 230 (negative electrode 240 being more negative than anode 230). It should be appreciated that the catholyte, anolyte, and water need to be managed and routed during device 220 operation, both for discharge and recharge, and that corresponding equipment of a standard type can be utilized for this purpose (not shown).

Figure 8:
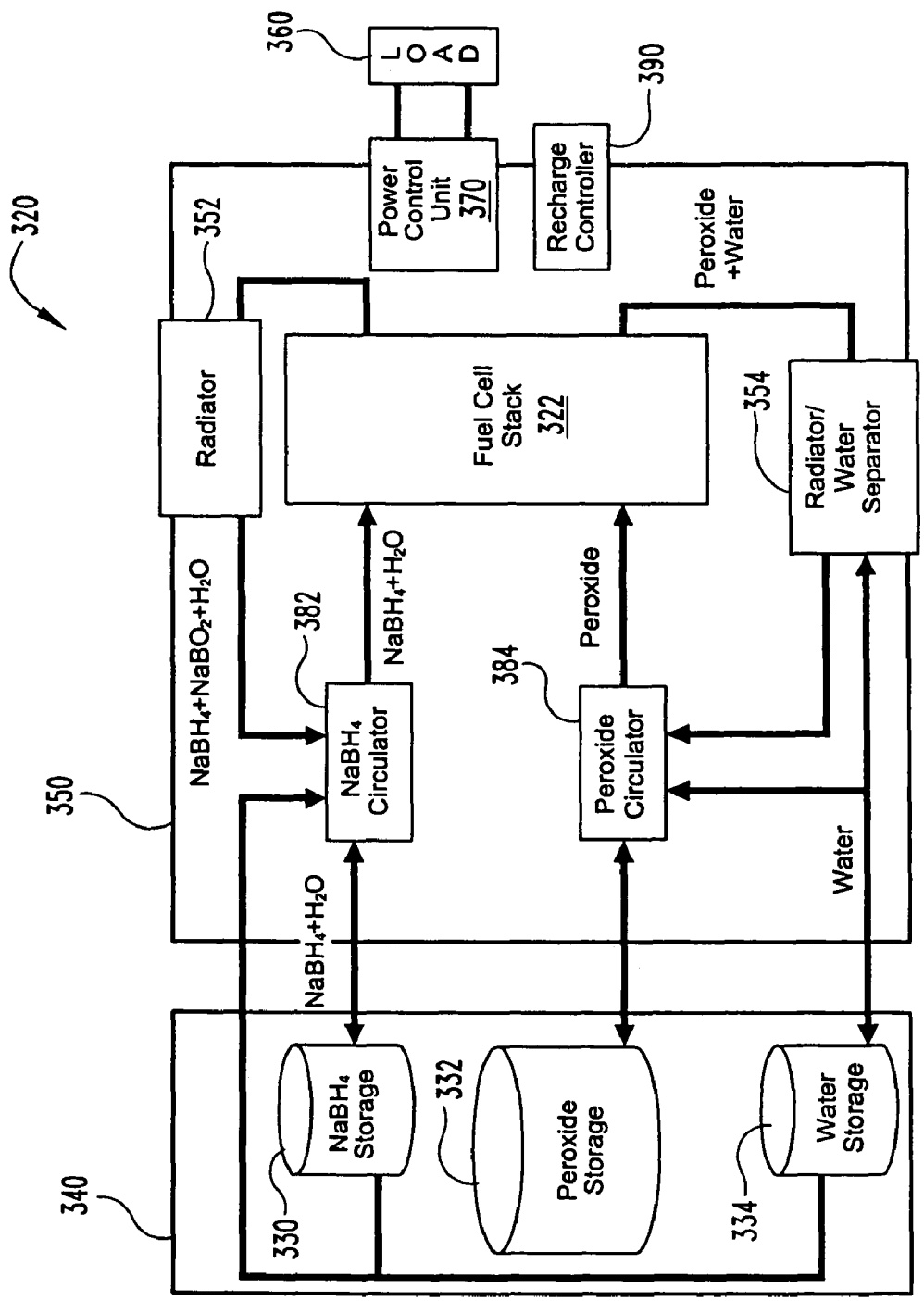
FIG. 8 is a block diagram of a fuel cell system including a number of the fuel cell devices shown in FIGS. 6 and 7.

Referring additionally to FIG. 8, power generation system 320 is illustrated that includes a fuel cell stack 322 comprised of a number of stacked fuel cell devices 220 (shown in FIGS. 6 and 7); where like reference numerals refer to like features of previously described embodiments. System 320 further includes $NaBH_4$ supply 330, hydrogen peroxide supply 332, and water holding tank 334. Collectively, supply 330, supply 332, and tank 334 provide supply and storage subsystem 340. Subsystem 340 is operatively coupled to discharge/recharge subsystem 350. Subsystem 350 includes stack 322, radiator 352, radiator/separator 354, electrical power control/regulation device 370, $NaBH_4$ circulator 382, $H_2O_2$ circulator 384, and recharge controller 290.

Circulators 382 and 384 each include one or more pumps, conduits, valves, meter, or the like to function as described hereinafter. Supply 330 includes a sodium borohydride ($NaBH_4$) storage tank and water handling/routing equipment coupled to water holding tank 334. As water is generated by the fuel cell discharge reaction, it is controllably circulated back to supply 330 and mixed with $NaBH_4$ to carry more of the corresponding solution to stack 322 to sustain the discharge reaction. This $NaBH_4$ solution is routed from supply 330 to subsystem 350 by pump 382. Supply 330 can include valves, metering controls, and/or sensors to regulate the supply, concentration, and/or pH value of the $NaBH_4$ solution provided to subsystem 350, as appropriate.

Supply 332 is arranged with a tank that stores concentrated hydrogen peroxide as well as corresponding water handling/routing equipment. In one nonlimiting example, a 60% hydrogen peroxide solution is utilized; however, other concentrations can be used in different embodiments. Water from the discharge reaction is circulated back to supply 332 with circulator 384 to dilute the concentrated hydrogen peroxide. Circulator 384 also is operable to provide the resulting $H_2O_2$/$H_2O$ mixture from supply 332 to stack 322. Source 332 can include valves, metering controls, and/or sensors to regulate the supply, concentration, and/or pH value of the peroxide solution provided to subsystem 350, as appropriate.

Radiator 352 and the radiator portion of radiator/separator 354 each eject waste heat to the environment that is generated by fuel cell operation. Either or both could be in the form of a heat exchanger for an underwater application, a space radiator for a spacecraft application, or such different form suitable for the particular application as would occur to one skilled in the art.

During an electricity discharge operation of fuel cell devices 220 in stack 322, sodium borohydride ($NaBH_4$) is catalytically processed at each corresponding discharge anode 230 and hydrogen peroxide is catalytically reduced at each corresponding discharge cathode 232 to provide electrical energy to electrical load 360. The electrical voltage, current and/or power output to load 360 is regulated with power control/regulator 370 during discharge. As the discharge reaction proceeds, it generates water at each discharge cathode 323, which is carried away with the circulating hydrogen peroxide. The separator portion of radiator/separator 354 separates at least a portion of the water and provides it to tank 334 of subsystem 340 for reuse as appropriate.

As the fuel and/or oxidizer of system 320 is spent, a regeneration (recharge) operating mode can be engaged. In one embodiment, the condition(s) triggering regeneration can be detected with controller 390. Alternatively or additionally, such condition(s) can be detected with power controller/regulator 370, can be manually triggered, and/or such different arrangement could be used to change operating modes as would occur to one skilled in the art. During recharge operation, for each cell device 220, an electric potential difference is applied across regeneration negative electrode 240 and regeneration positive electrode 242 with controller 390. In one nonlimiting example, the relative electric potentials and corresponding electrode materials could be those described for device 220 in connection with system 210 of FIG. 6. In other examples, the applied recharge potential(s), electrode materials, cell configuration, or the like could be varied and/or may be directed to different fuel and/or oxidizer constituents.

As recharging progresses, sodium borohydride ($NaBH_4$) and hydrogen peroxide ($H_2O_2$) are regenerated, and are routed back to the respective tanks of supplies 330 and 332 in an aqueous solution. Once a desired recharge level is reached, system 320 can return to a discharge mode of operation, as desired for the particular application. It should also be appreciated that in other embodiments, system 320 could vary by mixing, exchanging, or duplicating the various embodiments of fuel cells described herein. Alternatively or additionally, other embodiments may vary in the particular fuel cell geometry or physical configuration, in the type of fuel used, in the type of oxidizer used, in the type of recharge methodology/ equipment used, and/or in the way reactants or reaction products are handled. In still other embodiments, a single fuel cell instead of a stack may be utilized and/or a recharge capability may be absent.

Figure 9:
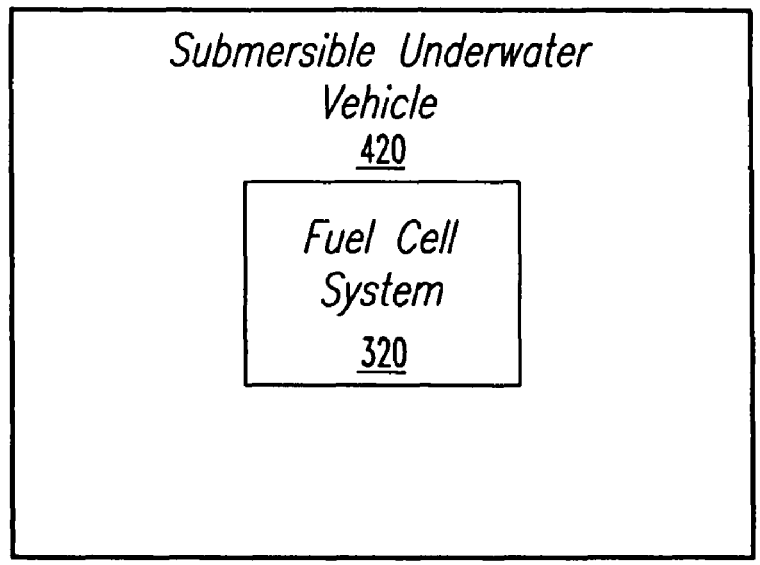
FIG. 9 is a diagrammatic view of a submersible underwater vehicle with the system of FIG. 8 to provide electrical power.
Figure 10:
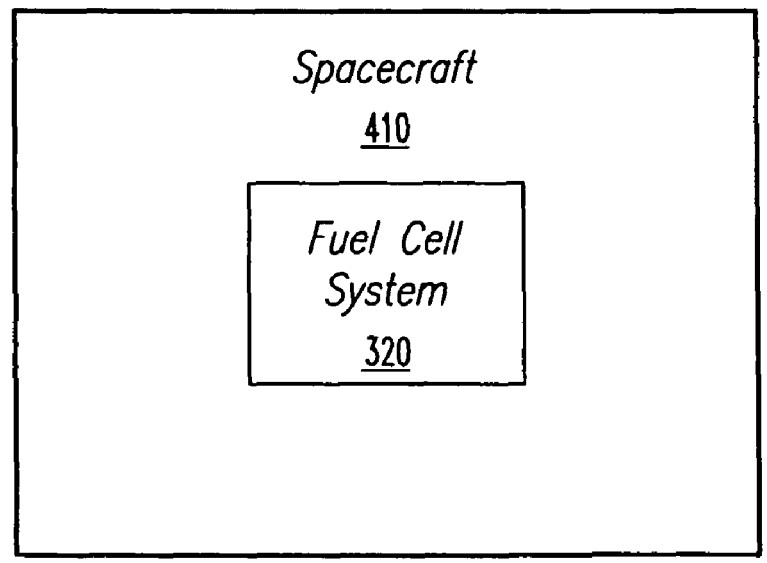
FIG. 10 is a diagrammatic view of a spacecraft with the system of FIG. 8 to provide electrical power.

Any of these fuel cell system embodiments and their variations could be used in various applications, including but not limited to those illustrated in FIGS. 9 and 10. Referring to FIG. 9, a further embodiment includes system 320 in a submersible underwater vehicle 420 as illustrated therein. For this embodiment system 320 provides electric power to vehicle 420. In another embodiment illustrated in FIG. 10, system 320 is included in spacecraft 410 to provide electric power thereto. In still other embodiments, system 260 and/or device 220 are utilized in one or more different air independent applications. Yet other embodiments utilize system 260 and/or device 220 with or without air-independence.

One form of the present invention is a unique fuel cell. Other forms include unique methods, systems, devices, and apparatus involving fuel cells. Among these forms are methods, systems, devices, and apparatus directed to a liquid/ liquid type of fuel cell. For this liquid/liquid fuel cell type, a preferred embodiment includes hydrogen peroxide as a reactant, a more preferred embodiment includes sodium borohydride and hydrogen peroxide as reactants. Yet other forms include methods, systems, devices, and apparatus directed to regenerative fuel cells. For this regenerative fuel cell type, one preferred embodiment includes one or more regeneration electrodes in addition to two discharge electrodes, and a more preferred embodiment includes at least two regeneration electrodes in addition to two discharge electrodes.

A further form includes a fuel cell with an anode subassembly and a cathode subassembly. The anode subassembly includes an anode with one or more catalysts to generate protons from molecular hydrogen and provide the protons through a proton exchange membrane. The cathode subassembly includes a cathode with one or more catalysts to generate hydroxyl ions from hydrogen peroxide, and an ionselective arrangement to provide the hydroxyl ions for reaction with protons from the proton exchange membrane. The ion-selective arrangement can include a molecular sieve layer selective to hydroxyl ions and an ion-selective membrane, with the sieve layer being positioned between the cathode and the ion-selective membrane. Yet another form of the present invention includes a system comprising one or more of the fuel cells coupled to a hydrogen gas source and a hydrogen peroxide source, and an electrical load operatively coupled across the anode and cathode.

Another form includes oxidizing hydrogen at an anode and reducing hydrogen peroxide at a cathode to generate electrical power. The hydrogen can be provided in gaseous form by reacting water and a metallic hydride. The hydrogen peroxide can be provided in a liquid form. The act of oxidizing hydrogen can be performed with an anode subassembly comprising an anode and a proton exchange membrane. The anode includes a catalyst to generate protons from the hydrogen. Alternatively or additionally, the act of reducing hydrogen peroxide can be performed with a cathode subassembly comprising a cathode and an ion-selective arrangement. In one form, the ion-selective arrangement includes a molecular sieve layer and an ion-selective membrane to facilitate selective passage of hydroxyl ions from the cathode subassembly and separate hydrogen peroxide from the proton exchange membrane. The anode subassembly and the cathode subassembly can be provided in the form of a fuel cell.

In still another form, an $H_2/H_2O_2$ fuel cell is provided in which $H_2$ is oxidized at an anode while $H_2O_2$ is reduced at a cathode. The cell can include a proton exchange membrane as an electrolyte to conduct the $H^+$ ion (proton). When a proton exchange membrane is used, the $H_2O_2$ at the cathode is isolated from the proton exchange membrane by a layer of molecular sieve impervious to $H_2O_2$. This molecular sieve is permeable to water and to hydroxyl ions, and can be separated from the proton exchange membrane by an ion-selective membrane that is conductive to hydroxyl ions. A cathode of the cell can be made of one or more porous materials containing Fe, Pd, and/or one or more chemical compounds including Fe and/or Pd.

All publications and patent applications cited in this specification are herein incorporated by reference as if each individual publication or patent application were specifically and individually indicated to be incorporated by reference. Further, any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
   providing a fuel cell including an anode, a cathode, and an ion exchange membrane positioned therebetween;
   performing a first catalytic reaction at the anode to provide hydrogen ions from a hydride in liquid solution;
   performing a second catalytic reaction at the cathode to provide hydroxyl ions from liquid phase hydrogen peroxide;
   at least partially maintaining separation of the hydride and hydrogen peroxide with the ion exchange membrane positioned between the anode and the cathode;
   permitting selective ion passage through the ion exchange membrane to form water molecules from the hydrogen ions and the hydroxyl ions; and
   as the water molecules form from the hydrogen ions and the hydroxyl ions, generating an electric potential across the anode and the cathode to provide electric power with the fuel cell.

2. The method of claim 1, wherein the hydride in liquid solution comprises a metallic hydride dissolved in water.

3. The method of claim 1, wherein said ion exchange membrane further impedes passage of liquid hydrogen peroxide to the anode.

4. The method of claim 1, which includes:
   carrying the hydride in liquid solution, the liquid phase hydrogen peroxide, and the fuel cell with a spacecraft or a submersible underwater vehicle; and from the fuel cell, providing the electric power to the spacecraft or the submersible underwater vehicle.

5. The method of claim 1, wherein the anode comprises a first plate with grooves to receive an aqueous solution including at least part of the hydride and the cathode comprises a second plate with other grooves to receive a flow of at least part of the hydrogen peroxide, the first plate and the second plate being positioned opposite one another.

6. The method of claim 1, which includes regenerating the fuel cell with an electrical energy source coupled thereto.

7. The method of claim 1, wherein at least one of the anode and the cathode comprise a porous, electrically conductive substrate.

8. The method of claim 1, wherein the first catalyst comprises at least one of platinum, palladium, and an alloy including one or more of platinum and palladium.

9. The method of claim 1, wherein the second catalyst comprises at least one of iron, palladium, and an alloy including one or more of iron and palladium.

10. An apparatus, comprising:
a first source to supply a hydride in liquid solution;
a second source to supply hydrogen peroxide in liquid phase;
a fuel cell, including:
an anode subassembly in fluid communication with the first source to receive the hydride, the anode subassembly including an anode and a first catalyst to convert at least a portion of the hydride to hydrogen ions;
a cathode subassembly in fluid communication with the second source to receive the hydrogen peroxide, the cathode subassembly including a cathode and a second catalyst to convert at least a portion of the hydrogen peroxide to hydroxyl ions; and
an ion-selective arrangement positioned between the anode and the cathode to maintain separation of the hydride and hydrogen peroxide, the ion-selective arrangement being structured to permit selective ion passage therethrough to form water molecules from the hydrogen ions and the hydroxyl ions, the fuel cell being effective to correspondingly generate an electrical potential across the anode and cathode to provide electric power as the water molecules form.

11. The apparatus of claim 10, wherein the hydride comprises a metallic hydride.

12. The apparatus of claim 10, wherein at least one of the anode and the cathode comprise a porous, electrically conductive substrate.

13. The apparatus of claim 10, wherein said first catalyst comprises at least one of platinum, palladium, and an alloy including one or more of platinum and palladium.

14. The apparatus of claim 10, wherein said second catalyst comprises at least one of iron, palladium, and an alloy including one or more of iron and palladium.

15. The apparatus of claim 10, further comprising means for regenerating the fuel cell.

16. The apparatus of claim 10, further comprising a spacecraft or a submersible underwater vehicle carrying the first source, the second source, and the fuel cell.

17. The apparatus of claim 10, wherein the anode comprises a first plate with grooves to receive an aqueous solution including at least part of the hydride and the cathode comprises a second plate with other grooves to receive a flow of at least part of the hydrogen peroxide, the first plate and the second plate being positioned opposite one another.

* * * * *